Oct. 20, 1964     W. C. BURT     3,153,305
FINISHING MACHINE
Filed May 2, 1961     2 Sheets-Sheet 1
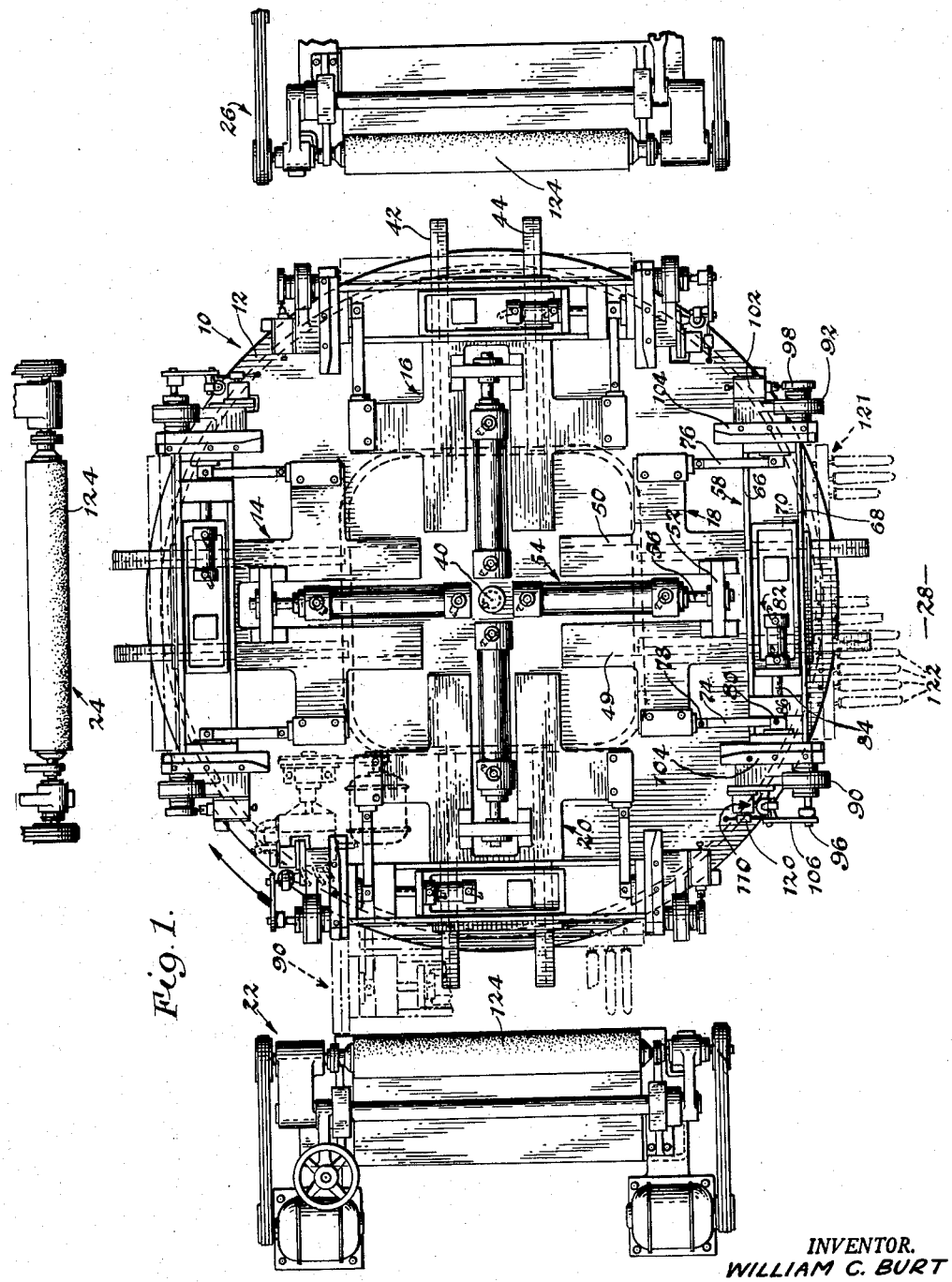
*INVENTOR.*
*WILLIAM C. BURT*
BY
*Bean, Brooks, Buckley + Bean*
ATTORNEYS

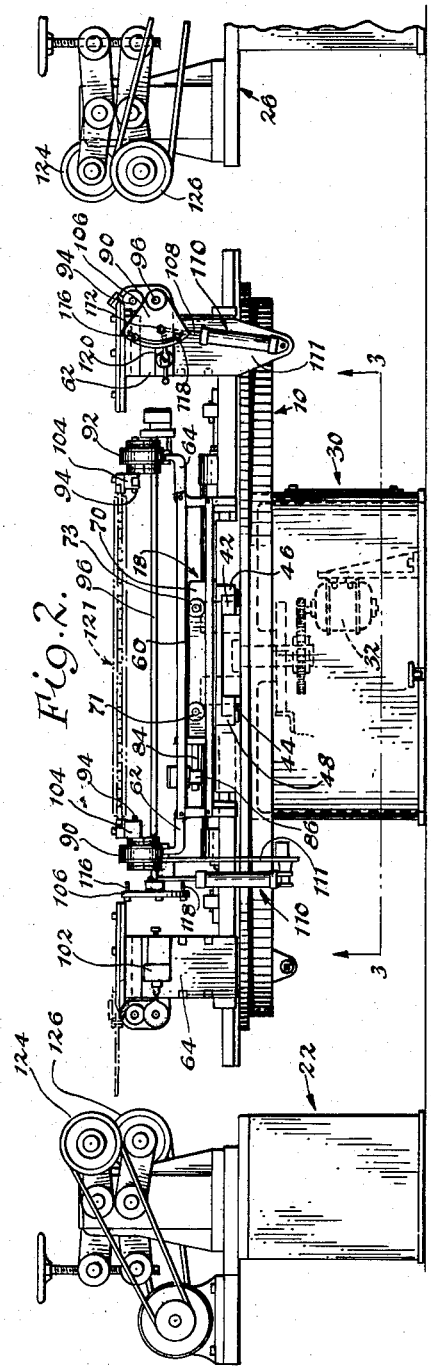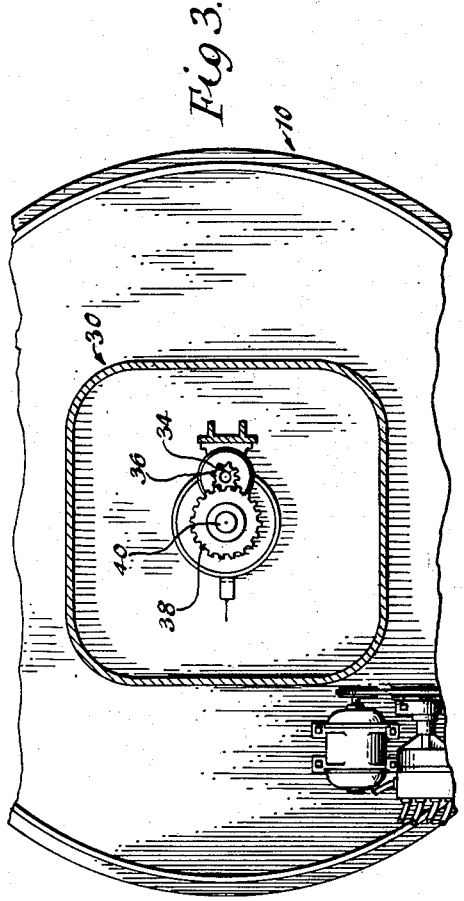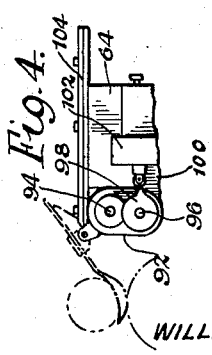
INVENTOR.
WILLIAM C. BURT
BY
Bean, Brooks, Buckley+Bean
ATTORNEYS

United States Patent Office 3,153,305
Patented Oct. 20, 1964

3,153,305
FINISHING MACHINE
William C. Burt, Olean, N.Y., assignor to Clair
Manufacturing Co., Inc., Olean, N.Y.
Filed May 2, 1961, Ser. No. 107,079
8 Claims. (Cl. 51—85)

This invention relates to surface finishing machines in general, and more particularly relates to a machine for the sequential finishing of discrete articles in a manner such as to materially expedite production techniques.

In finishing such articles, for example items of cutlery, flatware, kitchen tools, hand tools, and the like, in connection with the manufacture thereof it is usual practice to mount a plurality of such articles upon a common carrier or rack whereby to be fed in batch fashion between the rolls of an associated machine of the type having rotating paired rollers, whereby a batch of articles is simultaneously abraded or polished. However, several such abrading or finishing operations are usually required, such as are known for example as coarse and fine finishing and final polishing; and these several operations require corresponding handling of the ganged articles at each of such operations, that is, at each finishing machine. Therefore, it has heretofore been necessary for an operator to sequentially transfer the batches of articles to a series of machines and to divide his attention between several machines for performing the several finishing operations on the articles being manufactured. In accordance with the present invention, a single machine is utilized wherein the same incorporates a common work mounting means which is sequentially indexed between a plurality of finishing mechanisms so that an operator may be positioned at a single station to feed the articles in batch or ganged fashion to the machine and to receive the same in finished condition therefrom after the articles have been subjected to several sequential finishing operations prior to their ultimate discharge from the machine.

A further object of the invention is to provide a multiple station machine provided with a common bed means mounting thereon a plurality of separate work holding means whereby an operator positioned at one station may unload finished articles and load rough articles in batch lots or individually to each of the work holding means as they are indexed to him, and wherein all other work holding means in indexed positions other than at the operator's station will be subjected to finishing operations which may vary in nature in accordance with the particular station involved so that the articles are progressively treated to finished condition as they return in sequentially indexed positions back to the loading and unloading station.

In the drawings:

FIG. 1 is a plan view of a machine in accordance with the present invention illustrating the several finished mechanisms associated therewith and showing by way of example a 4-station work holding means;

FIG. 2 is an elevational view of the machine shown in FIG. 1 taken in front of the operator's station thereof and illustrating the operative relationship of the work holding means to the finishing mechanisms prior to engagement of the workpieces therewith;

FIG. 3 is an enlarged horizontal section taken substantially along line III—III in FIG. 2 illustrating the indexing mechanism in part; and FIG. 4 is an elevational view showing a portion of a particular type of work holding means.

Referring now more particularly to FIG. 1, the reference numeral 10 therein indicates in general the work holding means which will be seen to include a generally circular table 12 which mounts thereon a plurality of carriage mechanisms indicated generally by reference characters 14, 16, 18 and 20. Disposed in circumferentially spaced relationship around the mechanism 10 are a plurality of finishing mechanisms indicated by reference characters 22, 24 and 26 and the station as indicated by the reference character 28 represents the operator's station wherein the unloading and loading of the articles is performed.

Thus, in general, it will be appreciated that the mechanism 10 is rotatable to index the several carriages 14, 16, 18 and 20 at any one of the positions illustrated in FIG. 1 although it is also to be understood that the indexing operations are sequential. In this manner, the carriage 18 and the mechanism associated therewith is adapted to receive a fresh supply of articles to be finished whereafter these articles will be sequentially indexed for operation thereupon by the several machines 22, 24 and 26 before the articles are once again returned to the operator's station 28 whereat they are loaded and a fresh batch of articles are associated with the whole mechanism.

To the above ends, as can be seen more clearly in FIGS. 2 and 3, the table or bed 10 is mounted upon a suitable base indicated generally by the reference character 30 which houses therewithin a suitable source of power such as the electric motor 32 having a drive shaft 34 provided with a pinion 36 in operative engagement with a gear 38 affixed to a suitable post 40 also rigid with the bed 10. Suitable control means, actuated by the operator at station 28, and not specifically shown herein since it forms no part of the present invention, are provided to effect actuation of the motor 32 in such fashion that upon each actuation the bed 10 is caused to rotate through an angle of 90 degrees for sequentially indexing the mechanism.

Associated with each of the carriages 14, 16, 18 and 20 are a pair of rails such as the rails 42 and 44 in FIG. 1 which are disposed in parallel relationship and extended generally radially of the bed 10. The underside of each carriage is provided with depending side flange portions 46 and 48, see particularly FIG. 2, which guidably receive the rails 32 and 34 and thus permit reciprocation of the carriages therealong. Further, as can be seen in FIG. 1, each carriage will be seen to include two inner sections 49 and 50 joined by bridge piece 52 so as to leave an intervening space between the two sections for the accommodation of a piston and cylinder assembly such as indicated by reference character 54. The inner end of each of these piston and cylinder assemblies are anchored to the table 10 to be disposed in radially extended position thereon and the piston rod 56 of each extends therefrom for connection by suitable means to the associated bridge piece 52. Consequently, it will be seen that upon actuation of the mechanism 54 each associated carriage can be extended and retracted for purposes which will be presently apparent.

Mounted on each carriage is a work holding device such as the device indicated by reference character 58 in FIG. 1 and it is to be understood that each such device is movable transversely of its associated carriage for the purpose which will also be presently apparent. Each device 58 includes a platform 60 having uprights 62 and 64 fixed to its opposite ends, see FIG. 2. Between these uprights and spaced above the platform 60 are a pair of rails 66 and 68 which straddle, FIG. 1, an upraised portion 70 of each associated carriage 14, 16, 18 or 20. Fixed to the inner and outer sides of such portions 70 are pairs of rollers 71 and 73, FIG. 2, cooperable with each rail 66 and 68 to support each assembly for the aforesaid translatory movement. To constrain the assembly 58 relative to the carriage with which it is associated upon translational movement of the former, parallelogram links 74 and 76 are provided which are pivotally interconnected at their opposite ends, respectively, as at 78 and 80, to the carriage and the work holding means 58, respectively. Each carriage portion 70 carries a hydraulic motor 82 having a piston rod 84 projecting therefrom and connected to a suitable crosshead 86 carried between rails 66 and 68.

The above work holding devices are preferably constructed generally in accordance with the structure as disclosed in patent 2,612,005 and include a pair of gear cases 90 and 92 mounted at the upper ends of the uprights 62 and 64. A pair of gears, not shown, are housed within each of these gear cases, the upper of which is fixed on a stub shaft 94 journalled in its respective gear case 90 or 92 and the lower gears of the two cases are fixed on a common rocker shaft 96, FIG. 2 and 4. Rocker shaft 96 carries a cam 98 at one end which periodically actuates a finger portion 100 of a throttle valve device 102 controlling a respective motor 54 as disclosed in Patent 2,612,005. The other shaft 94 in each case projects laterally inwardly from its gear case and fixes one of the brackets 104 thereon, FIG. 2. The end of shaft 96 opposite cam 98 fixes a quadrant 106, FIG. 2, to which the piston rod 108 of hydraulic motor 110 is pivotally connected as at 112. The motor is mounted on plate 111 depending from upright 62, FIG. 2. The quadrant 106 is arcuately slotted as shown in FIG. 2 and is provided with adjustable stop or limit pins 116 and 118 therein which control a reversing valve 120 for the motor 110.

Thus, it will be seen that the brackets 104 are caused to oscillate according to the control pins 116 and 118 and limited reciprocation of the carriages 14, 16, 18 or 20 is effected by the throttle valves 102. The brackets 104 removably receive the racks 121 for holding the ganged articles 122 for presentation to the various machines 22, 24 and 26. Each machine 22, 24 and 26 includes a pair of driven rolls as shown at 124 and 126, FIG. 2, which are adapted to open and close in accord with the advance of the ganged workpieces therebetween, and each may be automatically controlled in this respect as specified in Patent 2,612,005. Thus, in this case the workpieces will be caused to be oscillated in curvilinear paths between the rolls, while being also reciprocated laterally therebetween if desired; and it will be appreciated that this operative arrangement is particularly adapted to the processing of bowl-shaped objects such as for example the bowl portions of spoons or the like.

It will be apparent that the present invention features a unit machine arrangement wherein a single workpiece holding table, having a plurality of separate workpiece holding components, intermittently rotates to progressively present its workpiece holding components to a loading station and then to a sequence of progressive finishing stations before return to said loading station for unloading of the finished batch and reloading of new batches of unfinished articles. When each batch arrives at each finishing station the table rotation is interrupted and each workpiece holding mechanism is automatically moved radially of the table so as to transport the workpieces into the operative range of the finishing machines grouped about the table. These machines then process the workpieces as explained hereinabove until the control mechanism causes the machines to "open" and the workpiece holders to retract relative to the table. The table then rotates to a new indexed position so as to align the workpiece holding mechanism with the next successive station, whereupon the process is repeated.

Whereas only a few specific examples of the invention have been described hereinabove it will be understood that various changes may be made therein without departing from the spirit of the invention or the scope of the appended claims.

1. A multiple station surface finishing machine comprising a rotatable table having a plurality of radially extending slideways, a work-supporting assembly mounted on each of said slideways for moving workpieces supported thereby radially outwardly of the table for presentation to one of a plurality of finishing machines grouped thereabout, and means for sequentially indexing said table for presentation of the workpieces sequentially to said finishing machines.

2. An assembly for performing sequential finishing operations on batches of workpieces comprising a rotatable table, means for sequentially indexing said table in step-by-step fashion past an operator's station, work-carrying means carried by said table and sequentially indexed to said operator's station, each work-carrying means including brackets for receiving a work holder for a batch of like articles to be surface-finished, means for radially extending each work-carrying means relative to said table when the same is in any indexed position, a surface finishing machine at each of the indexed positions of said table other than at the operator's station for performing successive surface finishing operations on articles sequentially indexed and presented thereto.

3. An assembly for performing sequential finishing operations on a workpiece comprising a rotatable table, means for sequentially indexing said table in step-by-step fashion past an operator's station, work-carrying means carried by said table and sequentially indexed to said operator's station, each work-carrying means including brackets for receiving a work holder for an article to be surface finished, means for extending each work-carrying means relative to said table when the same is in any indexed position, a surface finishing machine at each of the indexed positions of said table other than at the operator's station for performing successive surface finishing operations on articles sequentially indexed and presented thereto, and means for imparting reciprocatory motion to said brackets when presented to said surface finishing machines.

4. An assembly for performing sequential finishing operations on batches of workpieces comprising a rotatable table, means for sequentially indexing said table in step-by-step fashion past an operator's station, work-carrying means carried by said table and sequentially indexed to said operator's station, each work-carrying means including brackets for receiving a work holder for a batch of like articles to be surface finished, means for extending each work-carrying means relative to said table when the same is in any indexed position, a surface finishing machine at each of the indexed positions of said table other than at the operator's station for performing successive surface finishing operations on articles sequentially indexed and presented thereto, and means for imparting reciprocatory motion to said brackets when presented to said surface finishing machines, the last means including mechanism for reciprocating said work-carrying means radially of the table independent of work-presenting motion thereof.

5. An assembly for performing sequential finishing operations on workpieces comprising a rotatable table, means for sequentially indexing said table in step-by-step fashion past an operator's station, work-carrying means carried by said table and sequentially indexed to said operator's station, each work-carrying means including brackets for receiving a work holder for an article to be surface finished, means for extending each work-carrying means relative to said table when the same is in any indexed position, a surface finishing machine at each of the indexed positions of said table other than at the operator's station for performing successive surface finishing operations on articles sequentially indexed and presented thereto, means for imparting reciprocatory motion to said brackets when presented to said surface finishing machines, the last means including mechanism for reciprocating said work-carrying means radially of the table independent of work-presenting motion thereof, and mechanism for imparting lateral reciprocation of workpieces presented to the surface finishing machines.

6. An assembly for performing sequential finishing operations on workpieces comprising a rotatable table, means for sequentially indexing said table in step-by-step fashion past an operator's station, work-carrying means carried by said table and sequentially indexed to said operator's station, each work-carrying means including brackets for receiving a work holder for articles to be surface finished, means for extending each work-carrying means relative to said table when the same is in any indexed position, a surface finishing machine at each of the indexed positions of said table other than at the operator's station for performing successive surface finishing operations on articles sequentially indexed and presented thereto, and means for imparting reciprocatory motion to all work-carrying means other than that indexed to the operator's station.

7. An assembly for performing sequential finishing operations on workpieces comprising a rotatable table, means for sequentially indexing said table in step-by-step fashion past an operator's station, work-carrying means carried by said table and sequentially indexed to said operator's station, each work-carrying means including brackets for receiving a work holder for a batch of like articles to be surface finished, means for extending each work-carrying means relative to said table when the same is in any indexed position, a surface finishing machine at each of the indexed positions of said table other than at the operator's station for performing successive surface finishing operations on articles sequentially indexed and presented thereto, and means for imparting reciprocatory motion to all work-carrying means other than that indexed to the operator's station, the last means including mechanism for imparting combined longitudinal reciprocation and vertical oscillation to the workpieces.

8. An assembly for performing sequential finishing operations on workpieces comprising a rotatable table, means for sequentially indexing said table in step-by-step fashion past an operator's station, work-carrying means carried by said table and sequentially indexed to said operator's station, each work-carrying means including brackets for receiving a work holder for articles to be surface finished, means for extending each work-carrying means relative to said table when the same is in any indexed position, a surface finishing machine at each of the indexed positions of said table other than at the operator's station for performing successive surface finishing operations on articles sequentially indexed and presented thereto, means for imparting reciprocatory motion to all work-carrying means other than that indexed to the operator's station, the last means including mechanism for imparting combined longitudinal reciprocation and vertical oscillation to the workpieces, and mechanism for imparting lateral reciprocation of the workpieces.

References Cited by the Examiner
UNITED STATES PATENTS

| | | | |
|---|---|---|---|
| 1,886,699 | 11/32 | Larson | 51—108 |
| 2,352,690 | 7/44 | Clausing | 51—145 |
| 2,458,708 | 1/49 | Johnson et al. | 51—93X |
| 2,507,998 | 5/50 | Russell | 51—108 |
| 2,612,005 | 9/52 | Burt | 51—234X |

LESTER M. SWINGLE, *Primary Examiner.*

FRANK H. BRONAUGH, FRANK E. BAILEY, J. SPENCER OVERHOLSER, *Examiners.*